July 7, 1964  R. C. PERSONS  3,140,025

BASKET FOR HANDLE BAR

Filed Oct. 17, 1963

INVENTOR
ROBERT C. PERSONS

BY *Charles R. Fay*
ATTORNEY

United States Patent Office 3,140,025
Patented July 7, 1964

3,140,025
BASKET FOR HANDLE BAR
Robert C. Persons, Worcester, Mass., assignor to Persons-Majestic Mfg. Company, Worcester, Mass., a corporation of Massachusetts
Filed Oct. 17, 1963, Ser. No. 317,000
4 Claims. (Cl. 224—36)

This invention relates to a new and improved basket construction preferably made of bent wire members appropriately secured together as by welding and having special new and improved means for attachment to the handle bar or riser bar of such vehicles as bicycles, motorcycles, and the like, to the end that the basket may be quickly and easily attached to and supported by the handle or riser bar and including interengaging means between the supporting bar and the basket especially formed for the reception and location of the basket on the bar, and including new and improved quick attachment and detachment means for securing the basket.

Other objects and advantages of the invention will appear hereinafter.

Reference is to be had to the accompanying drawings, in which.

Figure 1:
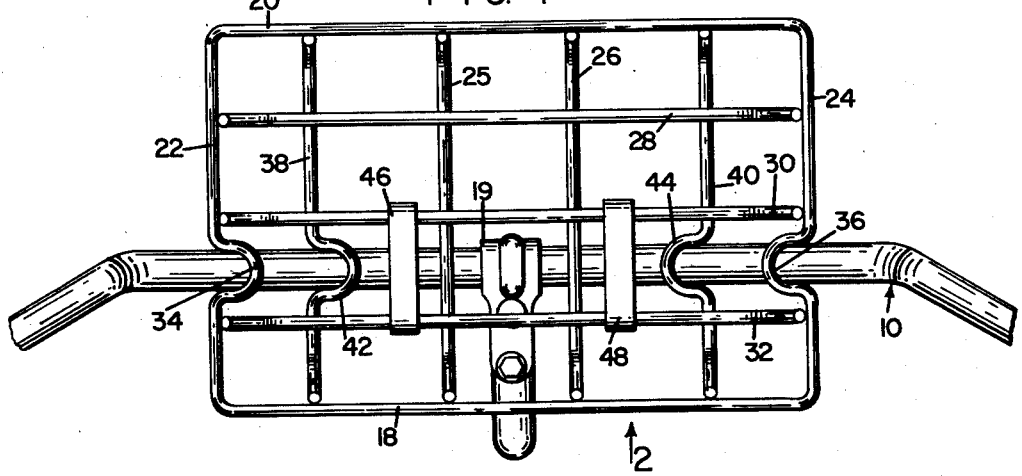
FIG. 1 is a top plan view illustrating the invention attached to the handle bar.

In carrying out the present invention, the handle bar is shown by the reference numeral 10 and it is made generally having a piar of downwardly converging elements 12 and 14 joined at their lower ends by a riser element 16. At the upper ends of the parts 12 and 14 there are provided outwardly extending members for accommodating the usual grips (not shown). This handle bar is preferably made of tubular material bent to the shape shown and described and having at a central portion in the riser member a connection at 19 for attachment to the usual post member for attachment of the handle bar to the frame of the cycle.

The basket comprises a top member including front wire member 18 and a like rear member 20 connected by side members 22 and 24. Members 18, 20, 22 and 24 are conveniently made of a single length of wire in the form desired. Suspended from the four members forming the top are a series of bent generally U-shaped wire members of which two at 25 and 26 extend from front to rear in vertical planes and three extend from side-to-side as at 28, 30 and 32, thus forming the basket, see particularly FIG. 2, including all four walls and the bottom. Each of the wire members 24, 26, 28, 30 and 32 are of general U shape with divergent ends attached as by welding to the top member 18, 20, 22, 24.

Intermediate the ends of the side members 22, 24 of the top there are provided a pair of inwardly directed substantially semicircular indentations or bent portions as indicated by the reference numerals 34 and 36 and these conform to and fit the parts 10 and 12 of the handle bar forming interfitting and interengaging means between the basket and the handle bar to position the former on the latter with the riser 16 located midway of the members 30 and 32 and parallel thereto.

Figure 2:
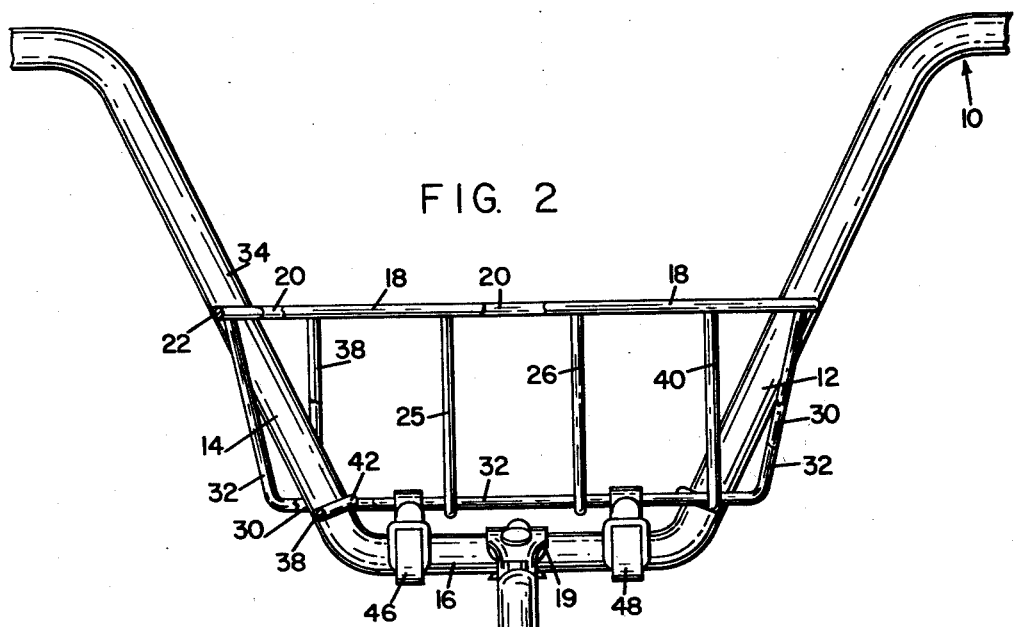
FIG. 2 is a view in front elevation thereof, parts being broken away.
Figure 3:
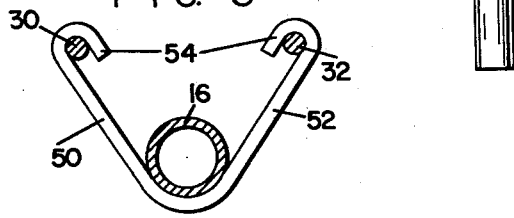
FIG. 3 is a sectional view illustrating a modification for the attaching means.

There are two further wire members 38 and 40 which extend from the rear member 20 to the forward member 18 of the top of the basket and these are similar to those at 24 and 26 but are provided in turn with the semicircular indentations or bent portions 42 and 44 which also interfit and interengage with the handle bar as perhaps best shown in FIG. 2. The bends 42, 44 extend slightly upwardly or slant because of their position in the bottom of the basket, whereas the inwardly directed bends 34 and 36 are located in the top of the basket and are generally in the plane of the top.

Thus it will be seen that all that is necessary to do to attach the basket is to drop the basket down onto the handle bar portions 12 and 14, the four bent portions 34, 36, 42 and 44 supporting and positioning the basket between the converging portions of the handle bar and supporting the same in a predetermined position. Once this has been done it is an easy matter to apply fasteners such as straps 46 and 48 of any kind over the wire members 30 and 32 and under the riser 16 as is indicated in FIGS. 1 and 2 to hold the basket from becoming dislodged.

Other means may be utilized in place of the straps 46 and 48 such as for instance spring clips 50 which are provided with a pair of diverging legs such as at 52 with inturned resilient fingers 54 to snap over the wire runs 30 and 32 holding the riser 16 and connecting the basket thereto, and other devices may of course also be utilized for this purpose. Thus the basket is quickly and easily attached and detached and is firmly held in desired position.

Having thus described my invention and the advantages thereof, I do not wish to be limited to the details herein disclosed, otherwise than as set forth in the claims, but what I claim is:

1. The combination with a cycle having a handle bar which includes a pair of spaced divergent portions and a connecting riser member; of a wire basket, said wire basket comprising a top continuous in form and including forward and rear members and connecting side members, the side members including inwardly directed portions interfitting and interengaging with the divergent portions of the handle bar, said basket also including body forming members secured to the top and certain of which include similar inwardly directed portions also interfitting and interengaging with the divergent portions of the handle bar, thus locating and supporting the basket in position on the handle bar between the divergent portions thereof, and means securing the basket to the handle bar.

2. The combination of claim 1 wherein the means securing the basket to the handle bar is detachable.

3. The combination with a handle bar for a cycle, said handle bar including two generally coplanar divergent portions extending generally vertically and a connecting horizontal riser; of a basket, said basket comprising a generally continuous top member in a generally rectangular form including forward and rear members and connecting side members, said side members each including an inwardly directed portion interfitting and interengaging the divergent portions of the handle bar intermediate the ends thereof, said basket also including a series of dependent members secured at their ends to the top member and extending downwardly and then transversely of the basket forming a bottom, certain of said members in the bottom of the basket including inwardly directed portions interfitting and interengaging with portions of the handle bar, forming a plurality of positioning members for the basket relative to the handle bar, the basket being supported on the handle bar at divergent portions, and means securing the transversely extending portions in the bottom of the basket with relation to said handle bar.

4. The combination of claim 3 wherein said last-named means is detachable.

References Cited in the file of this patent

UNITED STATES PATENTS 1,908,535    Pawsat _____ May 9, 1933
2,168,939    Kraeft _____ Aug. 8, 1939